United States Patent [19]
Souppe et al.

[11] Patent Number: 5,942,262
[45] Date of Patent: Aug. 24, 1999

[54] BISCUIT DOUGHS AND BISCUITS PRODUCTS AND METHODS OF PRODUCING SAME

[75] Inventors: Jerome Souppe, Wasquehal; Thierry Jean-Bernard Naeye, Toufflers, both of France

[73] Assignee: Gist-Brocades, Netherlands

[21] Appl. No.: 08/820,100

[22] Filed: Mar. 19, 1997

[30] Foreign Application Priority Data

Mar. 19, 1996 [EP] European Pat. Off. .............. 96200760

[51] Int. Cl.⁶ .............................. A21D 2/00; A21D 10/00; A21D 13/00; C12N 9/04; C12N 9/50
[52] U.S. Cl. .............................. 426/20; 426/63; 426/549; 426/808; 435/190; 435/219
[58] Field of Search ................................ 426/808, 549, 426/20, 63; 435/190, 219

[56] References Cited

U.S. PATENT DOCUMENTS

| | | | |
|---|---|---|---|
| 3,157,513 | 11/1964 | Allen et al. | 426/18 |
| 3,650,764 | 3/1972 | Duquette | 426/20 |
| 4,100,151 | 7/1978 | Adler-Nissen | 435/68.1 |
| 4,990,343 | 2/1991 | Haarasilta et al. | 426/10 |
| 5,108,765 | 4/1992 | Maat et al. | 426/20 |
| 5,178,897 | 1/1993 | Tanaka et al. | 426/602 |
| 5,451,413 | 9/1995 | Fok et al. | 426/19 |

FOREIGN PATENT DOCUMENTS

| | | |
|---|---|---|
| 0 384 303 | 8/1990 | European Pat. Off. . |
| 0 588 426 | 3/1994 | European Pat. Off. . |
| 30 03 679 | 8/1981 | Germany . |
| 8322456 | 12/1996 | Japan . |
| 464857 | 8/1938 | United Kingdom . |
| 2007960 | 5/1979 | United Kingdom . |
| WO 94/28727 | 12/1994 | WIPO . |
| WO 94/28728 | 12/1994 | WIPO . |
| WO 94/28729 | 12/1994 | WIPO . |
| WO 95/01727 | 1/1995 | WIPO . |

OTHER PUBLICATIONS

Patent Abstracts of Japan, vol.. 13, No. 255, JP 10–60693, Mar. 7, 1989. (Abstract only).

WP51 Derwent Publications Ltd., JP 57 074 076, May 10, 1982. (Abstract only).

Harris et al., "A Study of the Effects of Proteolytic Enzymes and $KBrO_3$ Upon the Viscosity and Allied Properties of Dispersions of Hard Red Spring Wheat Gluten," Cereal Chem., vol. 17, No. 3, pp. 203–222 (Mar., 1940).

Olcott et al., "Stability of Wheat Gluten Dispersions Toward Reducing Agents in the Presence and Absence of a Gluten Proteinase," Cereal Chem., vol. 20, No. 1, pp. 87–97 (Jan. 1943).

Stauffer, C.E., *The Science of Cookie and Cracker Production*, Chapman & Hall, Chapter 6, pp. 237–238 (1994).

Swanson et al., "Effects of Papain, Yeast Water, Cysteine, and Glutathione on Gluten Dispersion or on Disintegration as Indicated by Gluten Recovery and by Mixogram Patterns," Cereal Chem., vol. 22, No. 3, pp. 134–149 (Mar. 1945).

Friedrich et al., "Vergleichende Untersuchungen zur Absorption enzymatischen Proteinhydrolysate am Dünndarm der Ratte 1. Mitt. Darstellung und Charakterisierung enzymatischen Hydrolysate aus Casein, Weizengluten und Ackerbohnenproteinisolat," Die Nahrung, vol. 26, No. 9, pp. 811–822 (1982). (Abstract attached at p. 820).

Tschimirov et al., "Funktionelle Eigenschaften von Pflanzenproteinen. 5. Mitt. Einfluβ einer enzymatischen Partialhydrolyse auf ausgewählte funktionelle Eigenschaften von Weizenkleber," Die Nahrung, vol. 27, No. 7, pp. 659–668 (1983). (Abstract attached at p. 667).

*Primary Examiner*—Jon P. Weber
*Attorney, Agent, or Firm*—McDonnell Boehnen Hulbert & Berghoff

[57] ABSTRACT

A dough suitable for baking biscuits is presented which comprises a proteinase which is at least partially inactivated by oxidation with an oxidizing agent and a second enzyme which produces the oxidizing agent. The protease is present in $10^6$ to $10^8$ NF/kg flour, and the enzyme which produces the oxidizing agent is present in 100 to 2000 SU/kg flour. The resulting dough has a consistency between bread dough and a fully hydrolyzed dough and is used to bake biscuits.

15 Claims, 3 Drawing Sheets

FIG.2 EXAMPLE I, TEST NO. 2, PAPAIN

BISCUIT DOUGHS AND BISCUITS PRODUCTS AND METHODS OF PRODUCING SAME

The present invention relates to a composition comprising an enzyme which produces an oxidising agent and a protease which is inactivated by that agent. Such compositions find use in doughs for baking.

Metabisulfite is currently used in the baking industry to soften doughs. In particular, sulfite is used in the biscuit industry to reduce shrinking of dough pieces and irregular sizing of baked products. Doughs contain as a minimum flour and water although they may well of course contain yeast, sugar, enzymes, sodium bicarbonate etc. Sulfite is thought to react with gluten proteins in a way that prevents them from forming inter covalent S-S bridges (C. E. Stauffer (1994), The Science of Cookie and Cracker Production ed. by Hamed Faridi, Chapman & Hall New York London, Chapter 6. p. 237–238). The effect of sulfite in dough is almost immediate and results in an inextensible and inelastic dough. Sulfite also activates wheat proteases which enhances the breakdown of the gluten structure (H. S. Olcott, L. A. Sapirstein, M. J. Blish, Cereal Chem. (1943) 20 (1), 87–97). Cysteine and glutathione were also shown to have similar effects. (C. O. Swanson, A. C. Andrews, Cereal Chem. (1945) 22 (3), 134–149).

Papain was one of the first enzymes applied to wheat gluten modification (C. O. Swanson, A. C. Andrews, Cereal Chem. (1945) 22 (3), 134–149; R. H. Harris, J. Jr Johnson, Cereal Chem. (1940) 17 (3), 203–222). The use of microbial proteases has been also described in many patents: U.S. Pat. No. 3,157,513, U.S. Pat. No. 1,377,798, U.S. Pat. No. 4,100,151, UK Patent 2007960, and German Patent Application DE 3003679 A1. Microbial proteases may be combined with porcine pancreas enzymes as described in EP 0384303. Partial enzymatic hydrolysis of wheat gluten has also been described using proteases from *Thermoactinomyces vulgaris* as described in M. Friedrich, J. Noack, R. Noack, Die Nahrung (1982) 26 (9) 811–822; J. I. Tschimirov, K. D. Schweinke, D. Augustat, V. Tolstoguzov, Die Nahrung (1983) 27 (7) 659–668.

Compared to sulfite, proteases work in a different way since they hydrolyse peptide bonds of gluten. This also lowers the degree of shrinking of dough pieces and gives more regular sizing of biscuits. Nevertheless the action of such proteases is time dependent. This is the major limiting factor in the use of proteases in doughs because biscuit manufacturers need some degree of freedom with regard to resting time of doughs. This is possible with the quick effect of reducing agents like sulfites but is not easy to manage with the continuous action of proteases.

It has been surprisingly found that a new combination of enzymes can enable biscuit manufacturers to mimic the effect of sulfite in dough. According to the present invention a combination is disclosed of a protease which is inactivated by oxidation and an enzyme capable of giving rise to such oxidation. This combination of enzymes can replace the metabisulfite in dough e.g. dough for baking such as in the production of biscuits.

The oxidation sensitive protease is preferably a thioprotease, for example papain or bromelain. The oxidating enzyme preferably produces, an oxidising agent such as $H_2O_2$ (hydrogen peroxide) which can inactivate the protease after a certain time period. Preferably the enzyme is glucose oxidase, sulfhydryl oxidase or amino acid oxidase. Good results may be obtained with papain, such as from *Carica papaya*, commercially available from Gist Brocades under the trade mark Protease V100, combined with a (eg. fungal) glucose oxidase, preferably from *Aspergillus niger*, commercially available from Gist Brocades under the trade mark Maxazyme GO 1500.

By using a protease that may be only active at the beginning of the dough preparation, shrinking of the dough may be reduced and more regular sizes of baked products, such as biscuits, can be obtained. The action of (or each) protease can then be substantially decreased when the concentration of the oxidizing agent(s) has reached a particular (inactivating) level. Therefore, the required amount of enzyme necessary for the production of sufficient oxidizing agent can be a function of the oxidation stability of the protease, the amount of protease present, the effectiveness of the oxidizing agent and the desired time after which the protease activity should be decreased to a desired level.

The activity of protease (NF) is determined by the hydrolysis of casein at pH 6.0, 40° C. for 60 minutes. One NF unit is the amount of enzyme needed to liberate the equivalent of 1 $\mu$g tyrosine per hour after precipitation of the remaining proteins with trichloracetic acid.

The activity of oxidases can generally be determined by oxidizing a substrate in a buffer (pH around 5.4) at a temperature around 37° C. for 10 minutes. The hydrogen peroxide produced is measured in the presence of horse radish peroxidase and o-dianisidine dihydrochloride. 1 SU is the amount of enzyme needed to consume 0.4 $\mu$mole oxygen/minute.

In general, $10^5$ to $10^9$ NF/kg flour, preferably $10^6$ to $10^8$ NF/kg flour of protease is added to (or present in) the dough. Of the enzyme that produces the oxidizing agent e.g. glucose oxidase, 50 to 50000 SU/kg flour, preferably 100 to 2000 SU/kg flour is added to (or is present in) the dough.

Taking glucose oxidase as an example, the activity of glucose oxidase (GOX) is determined by oxidizing glucose (0.11 M) in 0.1M phthalate buffer (pH 5.4) at 37° C. for 10 minutes in the presence of horse radish peroxidase (40 mg/l of POD-II, available from Boehringer Mannheim) and o-dianisidine dichlorhydrate (130 mg/l). 1 SU is the amount of enzyme needed to consume 0.4 $\mu$mole oxygen/minute under the conditions of the test.

Sulfhydryl oxidase (SOX) cannot be determined by the above method because hydrogen peroxide reacts with the substrate of SOX (glutathione). Instead, sulfhydryl oxidase activity is determined by measuring the decrease of the substrate glutathione as described by Young and Nimmo, Biochem. J. 130 (1972) 33. One sulfhydryl oxidase unit is equal to an enzyme amount required for depleting 1 $\mu$mole of oxygen/minute from a test mixture containing 8 mmol of GSH (glutathione) and 40 mmol of sodium acetate (pH 5.5) at 25° C.

The amount of hydrogen peroxide produced by 1 unit of SOX is about the same as for 1 unit of GOX (SU).

Use of the Farinograph and its Interpretation

The farinograph measures and records the resistance of a dough during mixing. With this apparatus it is possible to measure the effect of compounds that affect the consistency of a dough, such as metabisulfite and protease. A consistency of about 500 BU (Brabander Units) is a good consistency for bread baking. When the gluten in a dough is hydrolysed by a protease the resulting mixture containing starch and hydrolysed protein has a final consistency of from 100 to 200 BU. For biscuit baking the desired consistency is in between the consistency of a bread dough and of a fully hydrolysed dough, for example preferably from 300 to 400 BU.

The unit $DS_{15}$ is the decrease in the farinograph curve between the maximum and 15 minutes after the maximum.

The invention will now be described, by illustration only, with reference to the following Examples and drawings, in which.

EXAMPLE 1

A dough was prepared from a wheat flour by mixing 300 g flour and water (final volume 188 ml) for at least 20 minutes in a farinograph, as a control or with a protease and/or oxidising enzyme. For tests in which GOX was added, the dough was also supplemented with glucose (2 g/kg flour). Various parameters were measured for four doughs, the results of which are shown in the following Table.

TABLE 1

Figure 1:
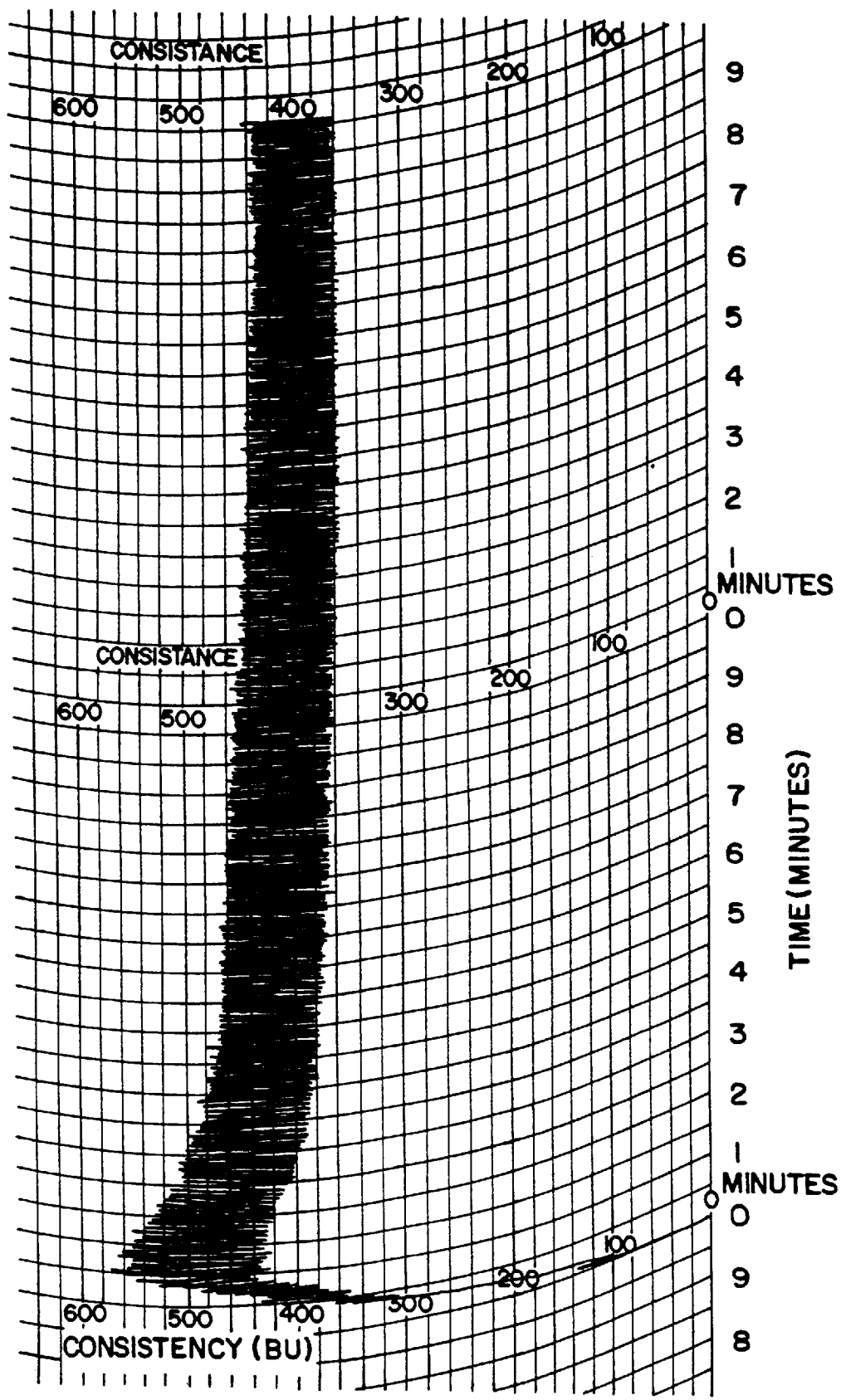
FIG. 1 is the farinogram of the dough of test no. 1 of Example 1.
Figure 2:
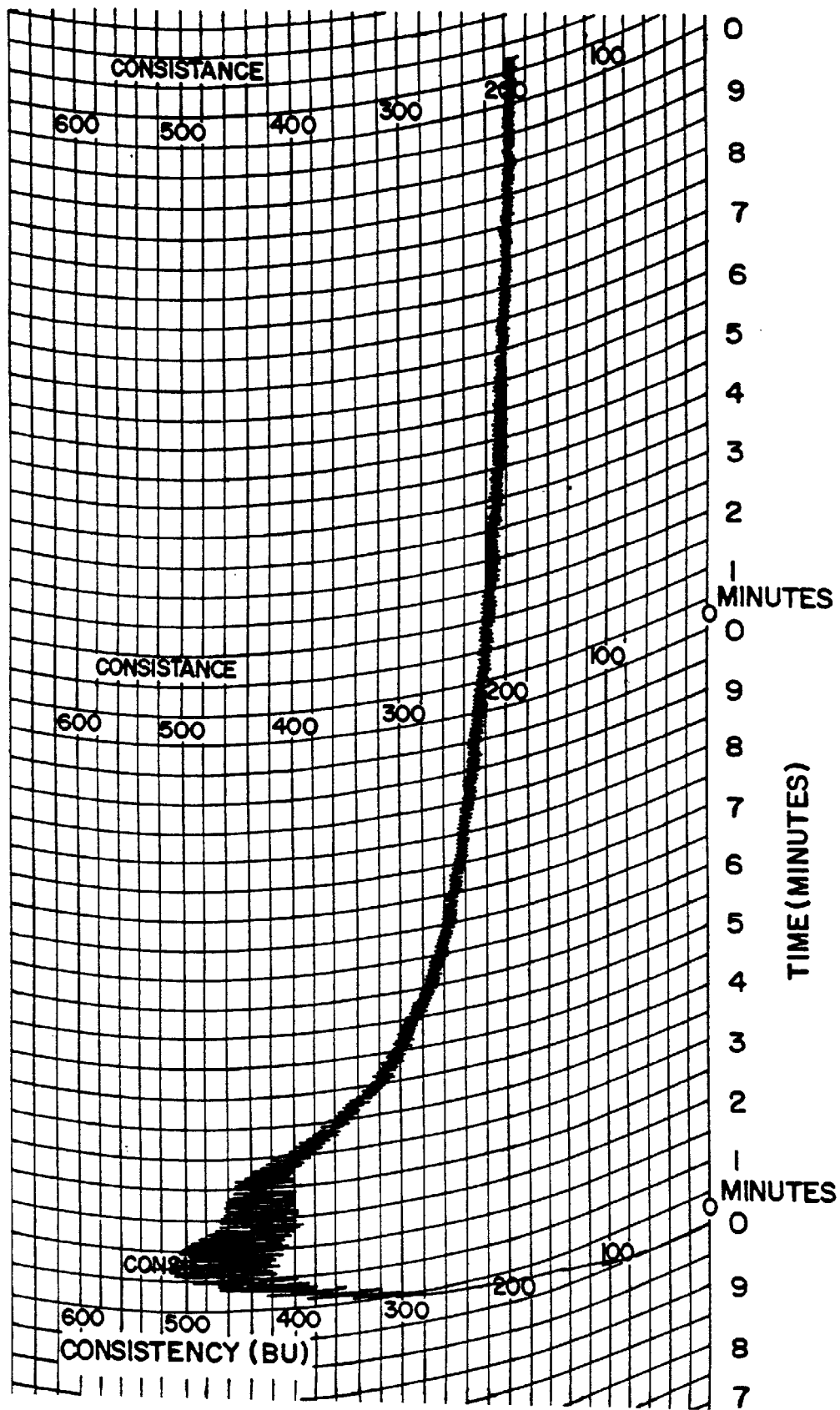
FIG. 2 is the farinogram of the dough of test no. 2 of Example 1.
Figure 3:
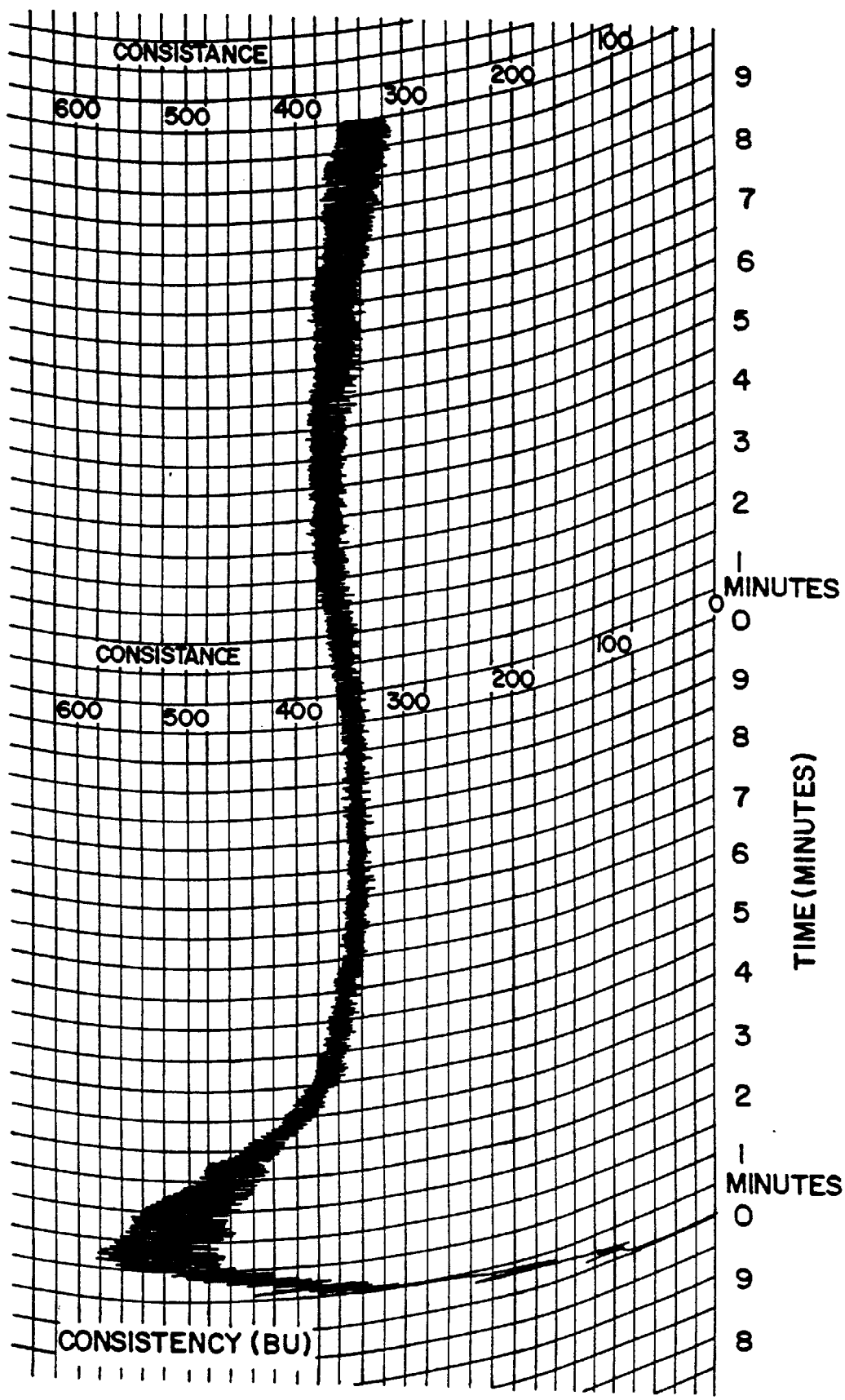
FIG. 3 is the farinogram of the dough of test no. 4 of Example 1.

| Test No. | Enzyme(s) | Dose/kg flour | $BU_{max}$ | $DS_{15'}$ | $BU_{width}$ | relates to |
|---|---|---|---|---|---|---|
| 1 | none | 0 | 500 | 100 | 70 | FIG. 1 |
| 2 | papain | $14.5 \times 10^6$ NF | 450 | 290 | 10 | FIG. 2 |
| 3 | GOX | 1000 SU | 490 | 90 | 80 | |
| 4 | papain + GOX | $14.5 \times 10^6$ NF + 1000 SU | 520 | 130 | 40 | FIG. 3 |

$DS_{15}$: degree of softening after 15 minutes in BU (Brabender Units)
$BU_{width}$: the width of the farinogram trace after 15 minutes mixing time. Typically the effect of proteases is to lower this value yielding a narrow trace in the farinogram.

The results show that glucose oxidase was able to reduce the action of papain. From the figures it is clear that papain hydrolyses the gluten too much so that the resulting dough is not suitable for biscuit baking. The combination of papain and GOX, however, results in a quick decrease in consistency to a desirable level. This level remains more or less constant over time. Prolonged mixing can even result in an increase in consistency, possibly due to indirect oxidation of the gluten by $H_2O_2$ produced by GOX.

EXAMPLE 2
Influence of Glucose Concentration

Tests were performed as described in Example 1 test No. 4 but with varied amounts of glucose in the doughs:

TABLE 2

| Test | Glucose g/kg flour | $BU_{max}$ | Mixing time to reach 370 BU |
|---|---|---|---|
| 1 | 0 | 490 | 24' |
| 2 | 2 | 520 | 15' |
| 3 | 10 | 520 | 14' |

The optimal levels of papain and GOX are dependent on the recipe and process conditions. For example the level of glucose influences the activity of GOX as can be seen from the results shown in Table 2.

Glucose is already present in flour (without any supplementation). Therefore the GOX and papain combination can function without added glucose, if necessary.

The results show that glucose addition enables the dough to recover some (consistency) strength sooner. As can be seen from the farinograph, the consistency first decreases and then increases back to a higher value than when GOX alone was present. Probably, only part of hydrogen peroxide produced by GOX is used to stop papain, part is being used also by peroxidases in the flour to strengthen back the gluten network. The effect of glucose is that more hydrogen peroxide is produced which makes the recovery of dough strength occur faster.

EXAMPLE 3
Influence of GOX Concentration

Tests were performed as described in Example 1 test No. 4 except that the amounts of GOX added to the dough were varied (papain was present at the level in No. 4 of Example 1).

TABLE 3

| Test No. | GOX addtion SU/kg flour | $BU_{max}$ | $DS_{15'}$ | $BU_{width}$ |
|---|---|---|---|---|
| 1 | 0 | 450 | 290 | 10 |
| 2 | 100 | 470 | 240 | 10 |
| 3 | 500 | 500 | 150 | 20 |
| 4 | 1000 | 520 | 130 | 40 |

The results shown in Table 3 indicate that with more GOX, the higher the consistency of dough.

EXAMPLE 4
Stability of Doughs

Tests were performed as described in Example 1 test Nos 2 and 4 and compared with a control of sulfite. Mixing time was 15 minutes in a first step; dough viscosity was measured after 1 h and 5 h resting times. Glucose was present in doughs at 2 g/kg flour.

TABLE 4

| Test No. | Enzyme | $BU_{max}$ | $BU_{1\,h}$ | $BU_{5\,h}$ | $BU_{width,\,1\,h}$ | $DS_{15}$ |
|---|---|---|---|---|---|---|
| 1 | papain | 450 | 180 | 180 | 10 | 290 |
| 2 | papain + GOX | 520 | 320 | 240 | 40 | 130 |
| 3 | 200 ppm sulfite | 480 | 340 | 290 | 30 | 100 |

In test No. 3,200 ppm sulfite was used. Doses in biscuit manufacture may range from 200 to 1200 ppm depending on the products and processes involved. $BU_{5h}$ will be lower with a higher dose of sulfite.

The effect of GOX in combination with papain was to strengthen the dough enough to stabilize it in a way similar to sulfite.

We claim:

1. A dough suitable for baking biscuits comprising:
    (a) a protease which is at least partially inactivated on oxidation by an oxidizing agent; and
    (b) an enzyme which produces said oxidizing agent, wherein said protease is present at from $10^6$ to $10^8$ NF/kg flour, said enzyme which produces said oxidizing agent is present at from 100 to 2000 SU/kg flour, and said dough has a consistency that is between the consistency of a bread dough and of a fully hydrolyzed dough.

2. The dough according to claim 1 wherein said protease is a thioprotease.

3. The dough according to claim 1 wherein said oxidizing reagent is $H_2O_2$.

4. The dough according to claim 1 wherein said enzyme which produces said oxidizing agent is selected from the group consisting of glucose oxidase, sulfhydryl oxidase, and amino acid oxidase.

5. The dough according to claim 1 wherein said protease is papain obtained from *Carica papaya*.

6. The dough according to claim 1 wherein said enzyme which produces said oxidizing agent is glucose oxidase obtained from *Aspergillus niger*.

7. The dough according to claim 1 which further comprises additional dough ingredients.

8. The dough according to claim 1 wherein said protease is present at from $10^6$ to $10^7$ NF/kg flour.

9. The dough according to claim 1 wherein said enzyme which produces said oxidizing is present at from 500 to 1500 SU/kg flour.

10. The dough according to claim 1 wherein said protease is papain or bromelain.

11. A method of making a dough suitable for baking biscuits, the process comprising admixing the following ingredients:
   (a) a protease that is at least partially inactivated by an oxidizing agent;
   (b) an enzyme which produces that oxidizing agent;
   (c) flour; and
   (d) water,
wherein said protease is present at from $10^6$ to $10^8$ NF/kg flour, said enzyme which produces said oxidizing agent is present at from 100 to 2000 SU/kg flour, and said dough has a consistency that is between the consistency of a bread dough and of a fully hydrolyzed dough.

12. In an improvement of a method of making biscuit dough or a baked biscuit product, the improvement which comprises including in said dough or said baked biscuit product the enzyme composition comprising:
   (a) a protease which is at least partially inactivated on oxidation by an oxidizing agent; and
   (b) an enzyme which produces said oxidizing agent,
wherein said protease is present at from $10^6$ to $10^8$ NF/kg flour, said enzyme which produces said oxidizing agent is present at from 100 to 2000 SU/kg flour, and said dough has a consistency that is between the consistency of a bread dough and of a fully hydrolyzed dough.

13. In an improvement of a method of making biscuit dough or a baked biscuit product, the improvement which comprises substituting for the sulfite in said dough or said baked biscuit product the enzyme composition comprising:
   (a) a protease which is at least partially inactivated on oxidation by an oxidizing agent; and
   (b) an enzyme which produces said oxidizing agent,
wherein said protease is present at from $10^6$ to $10^8$ NF/kg flour, said enzyme which produces said oxidizing agent is present at from 100 to 2000 SU/kg flour, and said dough has a consistency that is between the consistency of a bread dough and of a fully hydrolyzed dough.

14. A process for producing a baked biscuit product, the process comprising:
   (i) obtaining a biscuit dough which comprises
      (a) a protease which is at least partially inactivated on oxidation by an oxidizing agent;
      (b) an enzyme which produces said oxidizing agent;
      (c) flour and water; and
   (ii) baking said dough to obtain said baked biscuit product,
wherein said protease is present at from $10^6$ to $10^8$ NF/kg flour, said enzyme which produces said oxidizing agent is present at from 100 to 2000 SU/kg flour, and said dough has a consistency that is between the consistency of a bread dough and of a fully hydrolyzed dough.

15. A baked biscuit produced by a process according to claim 14.

* * * * *

UNITED STATES PATENT AND TRADEMARK OFFICE
CERTIFICATE OF CORRECTION

PATENT NO. : 5,942,262
DATED : August 24, 1999
INVENTOR(S) : Souppe, et al.

It is certified that error appears in the above-identified patent and that said Letters Patent is hereby corrected as shown below:

Title Page, Field [54], delete "Biscuits Products", and insert -- Biscuit Products --

Column 1, line 1, delete "Biscuits Products", and insert -- Biscuit Products --
Column 1, line 6, delete "oxidising", and insert -- oxidizing --
Column 1, line 62, delete "oxidising", and insert -- oxidizing --
Column 3, line 15, delete "oxidising", and insert -- oxidizing --
Column 4, line 16, delete "GOX addtion", and insert -- GOX addition --
Column 5, lines 10-12, replace claim 9 with the following:

9. The dough according to claim 1 wherein said enzyme which produces said oxidizing agent is present at from 500 to 1500 SU/kg flour.

Signed and Sealed this

Twenty-ninth Day of August, 2000

Attest:

Attesting Officer

Q. TODD DICKINSON
Director of Patents and Trademarks